United States Patent [19]
Eichelberger

[11] 3,784,907
[45] Jan. 8, 1974

[54] METHOD OF PROPAGATION DELAY TESTING A FUNCTIONAL LOGIC SYSTEM

[75] Inventor: Edward Baxter Eichelberger, Purdy Station, N.Y.

[73] Assignee: International Business Machines Corporation, Armonk, N.Y.

[22] Filed: Oct. 16, 1972

[21] Appl. No.: 298,071

[52] U.S. Cl. ........ 324/57 DE, 235/151.31, 235/153, 324/73 AT
[51] Int. Cl. ............................................. G01r 27/00
[58] Field of Search ................... 324/57 DE, 73 AT; 235/153, 151.31

[56] References Cited
UNITED STATES PATENTS
3,659,088  4/1972  Boisvert, Jr. ............... 324/73 AT X
3,714,403  1/1973  Ammann et al. ............ 324/73 AT X

OTHER PUBLICATIONS
Lindbloom et al., Program for Determining Reset–On Time in Weighted Adaptive Test Patterns, IBM Technical Discl. Bulletin, 7/72, pp. 399 & 400.

Primary Examiner—Stanley T. Krawczewicz
Attorney—John F. Osterndorf, Wesley DeBruin & A. J. Riddles

[57] ABSTRACT

Propagation delay testing is performed on a generalized and modular logic system that is utilized as an arithmetic/logical unit in a digital computer. Each arithmetic/logical unit of a computer is formed of arrangements of combinational logic networks and storage circuitry. The storage circuitry has the capability for performing scan-in/scan-out operations independently of the system input/output and controls. Using this scan capability, the method of the invention provides for the state of the storage circuitry to be preconditioned and independent of its prior history. Selected propagation paths through the system circuitry are sensitized by test patterns from an automatic test generator. By altering selected inputs and cycling controls applied to the networks of combinational logic and their respective associated storage circuitry, propagation delay indications through the selected paths are obtained to determine the status of these path delays through the logic system.

9 Claims, 9 Drawing Figures

METHOD OF PROPAGATION DELAY TESTING A FUNCTIONAL LOGIC SYSTEM

BACKGROUND OF THE INVENTION

1. Field of the Invention

This invention relates to logic system testing and, more particularly, to the testing of path delays through a functional organization of logic utilized in general purpose digital computers.

2. Description of the Prior Art

In the past, the designer of computer logic has had complete flexibility in arranging logic circuitry to implement system and sub-system logic functions in central processing units, channels and control units employed in digital computing apparatus. A significant variety of design implementations has resulted from the exercise of this flexibility. Each of these implementations has its own special dependency on the ac characteristics of the individual circuits employed in the system. The interface that existed between the logic designer and component manufacturer as a result of these implementations was reasonably well defined and the approach of the past could be supported in component manufacturing since the ac parameters of the circuits, such as rise time, fall time, individual circuit delay, etc. could rather readily be tested.

With the advent of large scale integration, however, this well defined and reliably tested interface no longer exists. Large scale integration, as is well known, provides the ability for the logic designer as well as the component manufacturer to maximize the capacity for placing hundreds of circuits on a single chip of semiconductive material. Such an ability offers the potential for reducing power, increasing speed, and significantly reducing the cost of digital circuits. However, with such highly dense configurations, it is impossible or impractical to test each circuit for all of the well known ac circuit parameters. As a result, it is necessary to partition and divide logic systems and sub-systems into functional units having characteristics that are substantially insensitive to these individual parameters. A generalized and modular logic system of this type is described in application Ser. No. 297,543, filed Oct. 13, 1972, entitled "Level Sensitive Logic System" by Edward B. Eichelberger, and assigned to the same assignee. Such functional units require dynamic testing methods that measure the performance of the entire functional package. The testing methods of the past ar unable to determine the performance of such functional units.

In the past, for example, each individual circuit has been tested for the usual and normal ac and dc parameters. Access to the modular unit for applying the input test conditions and measuring the output responses has been achieved through a fixed number of input/output connection pins. However, in the realm of large scale integrated functional units, the same number of input/output pins are available, but there is considerably more circuitry. Independent access to any individual circuit is no longer available.

Thus, in a typical module containing one hundred chips each having up to 600 circuits with a 300 circuit average, the module would contain at least 30,000 circuits. Parametric tests for the well known ac characteristics cannot be performed on such a unit. Accordingly, the testing must be performed through selected sensitized paths of an entire functional logic unit, be it at the chip level, the modular level, or other level. Such testing requires that automatic test pattern generation be utilized in providing the patterns for application to the entire logic system.

SUMMARY OF THE INVENTION

In accordance with an aspect of the invention, the method of testing is implementable on a generalized logic system having a scan-in/scan-out capability. It is applicable to all levels of the hierarchy of modular units. Such generalized logic systems have a single-sided delay dependency and depend solely on the occurrence of plural system clock trains.

Logical units testable according to the method of the invention employ clocked dc latches for all internal storage circuitry in the arithmetic/logical units of the computing system. This latch circuitry is partitioned along with associated combinational logic networks and arranged in sets. The plural clock trains are synchronous but non-overlapping and independent. The sets of latch circuitry are coupled through combinational logic to other sets of latches that are controlled by other system clock trains.

To accomplish scan-in/scan-out in performing the inventive test method, each latch circuit includes additional circuitry so that each latch functions as a shaft register latch having input/output and shift controls that are independent of the system clocks and the system input/outputs. All of these shift register latches are coupled together to form a single shift register having a single input, a single output and shift controls. With this additional circuitry, all of the system clocks can be de-activated, isolating all of the sets of latch circuits from one another. The effect of this isolation coupled with the scan-in/scan-out capability is to reduce all of the sequential circuitry to combinational circuitry. This permits automatically generated test patterns to be provided for measuring the propagation delays through selected paths in the logical unit.

To perform the inventive method, the logic system under test is set up to perform the dynamic ac measurements. The latch circuitry organized into sets is initialized. This is accomplished by shifting a test pattern into the latch circuits of the register using the scan access. Concurrent with the initialization of the latch circuitry, the test pattern is applied to the system inputs. The application of the test pattern to the system inputs and to the sets of latches involves the sensitizing of a selected path within the logic system under test. Such a path flows through a combinational circuit network and the effect is to condition the inputs to the individual circuits of the network so that when one of the primary inputs is changed, propagation of the change takes place through the particular sensitized path to a location for measurement. To effect a change, a primary input is altered. After a predetermined lapsed time following the changing of the primary input, any change that has resulted at the output of the sensitized path of the combinational network is measured.

Generally, four types of sensitized paths must be considered for testing propagation delay. These include the path from a primary input through a combinational circuit network to a primary output. A second path is from a primary input through a combinational circuit network to a latch set which forms part of the shift register. A third path is from a latch set forming a part of a shift register through a combinational circuit network to a primary output and the fourth path is from one set of latches through a combinational circuit network to a second set of latches. A primary input as used in the context of this invention is either a system input or a clock input provided at a particular time. The ability to shift test patterns into and out of the sets of latches arranged as a shift register using the independent scan access and controls coupled with the independence of the clock signals renders it possible to perform the dynamic testing of these types of paths for propagation delays.

Dependent on the particular path that has been sensitized for measurement of propagation delays, the measurement occurs either by direct observation or by exercising another clock train so as to gate the output of a combinational circuit network into a latch set. In this way, it may be shifted out using the scan access and controls for measurement. Thus, in those paths which run to a primary output, the measurement is performed directly. In those instances where the sensitized path runs to a latch set, the measurement is made by clocking the combinational circuit network into the set of latches, and then shifting out using the scan access and controls. In all instances, interrogation is made as to whether the output changed to a new value. If there had not been any change, then the propagation delay through the selected paths exceeds a predetermined value and the particular unit under test is rejected as being out of specification. On the other hand, if a change took place, an indication is provided that the propagation delay is within the particular specification and the unit is accepted.

In this manner, automatically generated test patterns are provided one at a time to the functional logic unit being measured. Each set of patterns is shifted into the register and also provided as input signals to the functional unit. By effecting a change in one of the system inputs or in one of the clock trains, a selected path is sensitized through at least a portion of the logical unit. Dependent on the portion selected, a measurement is made to determine if the requisite specification for propagation delays has been met. Repeating this procedure with a substantial number of test patterns from an automatic test generator, provides a clear indication of the propagation delays through the unit.

DESCRIPTION OF THE PREFERRED EMBODIMENT

The testing method of the invention may be utilized to test the propagation delays of selected sensitized paths in generalized and modular logic systems having a single-sided delay dependency and a scan-in/scan-out capability. Such systems are described with particularity in the aforecited copending application Ser. No. 297,543. Systems of this type are employed in the arithmetic and/or logical units (ALU) of a computing system, and form all or a substantial functional part of a central processing unit, a channel or a control unit in the computing system. The generalized and common logical configuration of such systems is not applicable to configurations other than ALUs, such as memory arrays, register arrays, or special circuitry such as analog circuits, sense amplifiers and hammer drivers.

The logic configuration of such a system, in addition to having a single-sided delay dependency, is organized so that correct operation of the structure is not dependent on rise time, fall time or minimum delay of any individual circuit in a logical unit. The only dependency is that the total delays through a number of levels or stages of logic is less than some known value. Such a configuration is referred to as a level sensitive.

For purposes of definition, a logic system is "level sensitive" if, and only if, the steady state response to any allowed input state change is independent of the circuit and wire delays within the system. Also, if an input stage change involves the changing of more than one input signal, then the response must be independent of the order in which they change.

It is readily apparent from this definition that the concept of level sensitive operation is dependent on having only allowed input changes. Thus, a level sensitive configuration includes some restriction on how the changes in the input signal occur. As described in the aforecited application, these restrictions on input changes are applied almost exclusively to the system clocking signals. Other input signals such as data signals have virtually no restrictions on when they may occur.

The term "steady state response" refers to the final value of all internal storage elements such as flip flops or feedback loops. A level sensitive system is assumed to operate as a result of a sequence of allowed input stage changes with sufficient time lapse between changes to allow the system to stabilize in the new internal state. This time duration is normally assured by means of the system clock signal trains that control the dynamic operation of the logic configuration.

The logic organization of such a system also incorporates the concept of configuring all internal storage elements so that they may function as shift registers or portions of shift registers having access and controls independent of the system access and controls. To implement this concept, all storage within the logic organization is accomplished by utilizing latches that are free of hazards or race conditions, thereby obtaining logic systems that are insensitive to any ac characteristics.

These latches are also level sensitive. In utilizing this shift register configuration, the scan-in/scan-out capability is realized.

The system is driven by two or more non-overlapping clock signal trains that are independent of each other. Each of the signals in a train need have a duration sufficient only to set a latch. The excitation signal and the gating signal for any clocked latch are a combinational logic function of the system input signals and the output signals from latches that are controlled by clock signal trains other than the train providing an input to such clocked latch.

One way to accomplish this latter objective is to have each such clocked latch controlled by exactly one of the system clock signals. When the gating signal and clock signal are both in an "on" or "up" condition, the clocked latch is set to the state determined by the excitation signal for that latch.

With a logic system organization according to these requirements, test patterns provided by an automatic test generator are supplied for accomplishing the propagation delay testing of the logic system according to the method of the invention. In the test generation system of FIG. 1, test patterns are provided to a unit under test 10. Such a unit is formed using the fabrication methods of large scale integration. It may be the lowest level unit of integration such as a semiconductor chip having hundreds of circuits contained with it or it may be a larger modular unit containing thousands of such circuits. In all instances, it satisfies the requirements of single-sided delay dependency and scan-in/scan-out capability. A more complete description of such an organization is described more particularly hereinafter.

Figure 1:
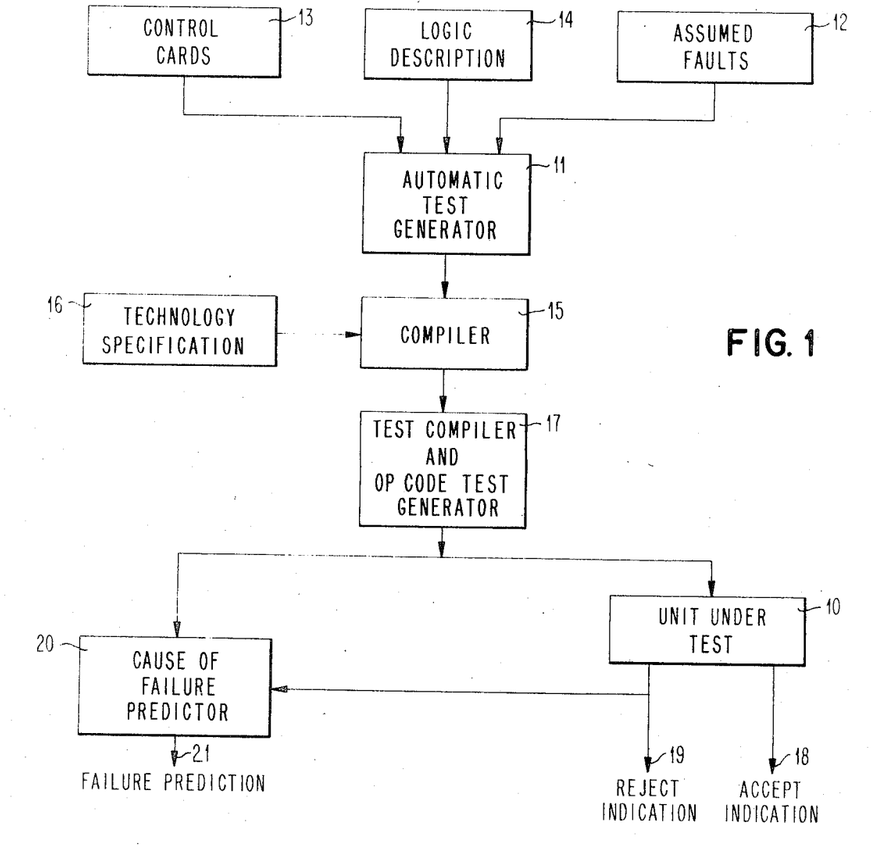
FIG. 1 is a block diagram of a testing system which may be employed in carrying out the method of the invention.

The test patterns supplied to unit under test 10 include both stimuli and the responses expected from the particular unit when acted on by a particular stimuli. The patterns are generated by an automatic test system which is included as a part of a general purpose digital computer. Such a computing system which may be employed to accomplish this objective is a System 360 Mod 65 or Mod 85. Such a system would include back up storage of one megabyte.

The organization of the system includes an automatic test generator 11 having a library of assumed faults 12 stored within it. It also includes the control cards 13 including all parameters necessary for generating the test patterns. The control cards 13 contain the procedures for operation and determine what routines and subroutines must be employed for accomplishing the testing on the particular unit under test. The assumed faults 12 are an algorithm for each type of circuit arrangement or network that may be tested. To determine the particular patterns to be generated and the paths to be sensitized, the logic description of the particular unit under test is provided at 14 to automatic test generator 11. Logic description 14 consists of the physical design of the particular unit and is employed as a basis for determining the particular test and the possible failures that may occur.

Automatic test generator 11 provides the logic patterns for the selected paths in the specific unit under test as defined by its logic decription 14. These logic patterns are provided to a compiler 15 in the system which also accepts specifications 16 from the particular technology employed in the unit under test. These specifications 16 consist of the values of voltages and currents that must be employed in that technology for the binary ones and zeros of the logic pattern. Compiler 15 provides technology patterns of binary ones and zeros at specific voltages and currents to test compiler and operation code test generator 17. Compiler and generator 17 provides the particular patterns that are applied to unit under test 10.

As already indicated, the test patterns include both the stimuli applied to the unit as well as the response expected. Test patterns for acceptable delay propagation operation are supplied directly to unit under test 10. Using the method of the invention, the unit is tested and an accept indication is provided at 18 or a reject indication at 19 when the measurement of the test is compared with the expected response. The reject indication may also be supplied as a part of the test generation system to a cause of failure predictor 20, which also receives from test compiler and operation code test generator 17, test data to predict failure operation. This aspect of the test generation system is employed in diagnostic type testing. Cause of failure predictor 20 then provides at 21 the particular failure prediction.

All of the apparatus and program controls necessary for generating the test patterns and for selecting and sensitizing paths through the circuitry in performing the tests are similar to the established techniques generating fault oriented dc tests which are well known in the art. For example, the programs necessary to develop the test patterns for performing combinational tests on unit under test 10 are described in a paper entitled "Algorithms for Detection of Faults in Logic Circuits" by W. G. Bouricius, et al. which was published in Research Report RC 3117 by the IMB Thomas J. Watson Research Center on Oct. 19, 1970. An algorithm for the computation of tests for failures is described in "Diagnosis of Automata Failures: A Calculus and a Method" by J. Paul Roth in the *IMB Journal of Research and Development*, July, 1966. These papers describe how to develop programmed algorithms for test generation and test evaluation. These include the generation of the assumed fault data necessary for the automatic test generation system. It is to be understood that the generation of the delay propagation tests for this invention is similar to the difficulty of generating a combinational dc test. Each test is defined by a combinational function as opposed to a sequential function. Thus, each possible ac test is determined by one of the $2^n$ combinations of the n binary values of the system inputs to the functional logic unit and the internal inputs from the sequential logic circuits of the unit.

It is to be recognized that the invention of this application does not reside in the generation of the test patterns for application to a unit under test or in the selection of paths to be sensitized but rather is directed to the method of testing the unit when the patterns are applied to selected sensitized paths. To accomplish the testing of a unit as indicated above, the requirements of single-sided delay dependency and scan-in/scan-out capability must be present in the unit. A generalized logic organization and structure incorporating these concepts is shown in FIG. 2.

Figure 2:
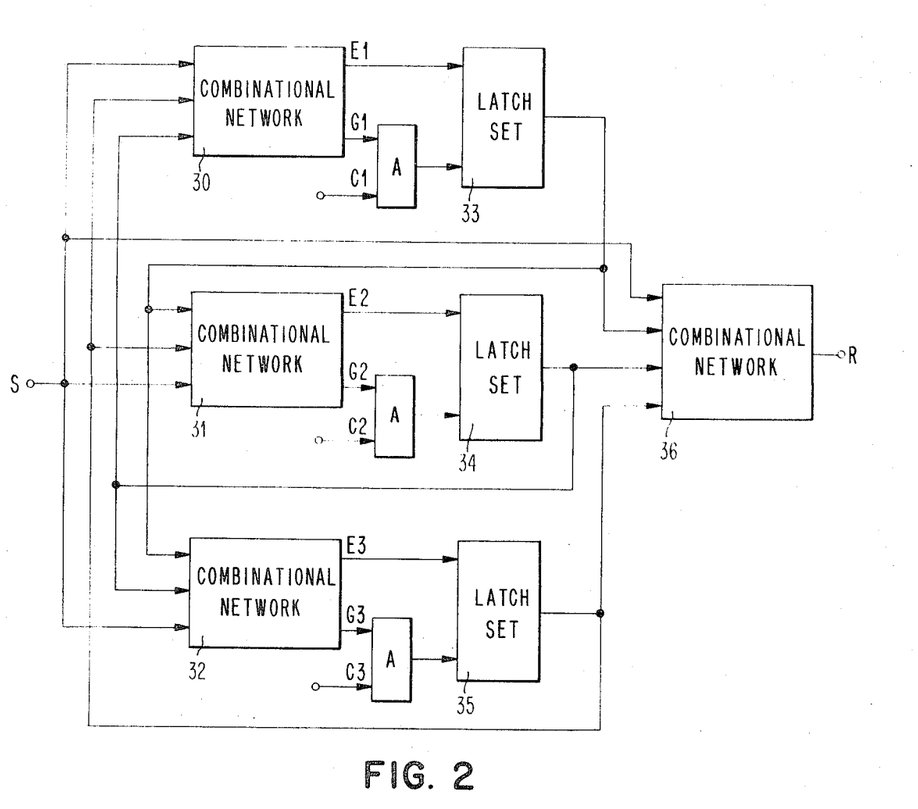
FIG. 2 is a schematic diagram of the organization of a generalized logic system that may be tested utilizing the principles of the invention.

The configuration of FIG. 2 is formed of a plurality of combinational logic networks 30, 31, 32 arranged in parallel. Each network is coupled into an associated set of latches 33, 34, 35, respectively. Effectively then, the logic system is partitioned into a plurality of parts each of which is composed of a combinational network and a set of latches. Although three such partitions are shown, it is to be understood that any number more or less than the number shown may be arranged in parallel in accordance with the invention. The system also includes an additional combinational network 36 for accepting the latch set output signals and for generating system output signals designated as a set of such signals R.

Each of the combinational networks 30, 31, 32 is a multiple input, multiple output, logic network. It includes any number of levels or stages of combinational circuits which may take the form of conventional semiconductor logic circuits. Each network is responsive to any unique input combination of signals to provide a unique output combination of signals. The output signals, such as E1, E2, E3, are actually sets of output signals so that the symbol E1 stands for e11, e12 ... e1N. Similarly, the symbols G1, G2 and G3 refer to sets of gating signals that may be provided by each of the combinational networks, respectively. The input signals provided to the combinational networks are the external input signals indicated as a set S of such signals and sets of feedback signals from the combinational networks and latch sets. It is to be understood that the term "set" shall mean a single item or a substantial plurality of such items.

To render the generalized structure capable of being tested according to the method of the invention, it is a necessary requirement that a latch or latch set controlled by one clock signal train cannot be coupled back through combinational logic to other latches that are controlled by the same clock signal train. Thus, the output from latch set 33 cannot be coupled back into combinational network 30, as latch set 33 is responsive to clock train C1. However, this latch set can be coupled into combinational networks 31, 32, both of which are responsive to different clock trains.

One way of implementing this requirement is to provide a separate clock for each partition, as shown in FIG. 2. Thus, clock train C1 is coupled into latch set 33, clock train C2 into latch set 34 and clock train C3 into latch set 35. The manner in which each latch set is controlled by exactly one of these clock signal trains is for each controlling clock signal Ci to be associated with a latch Lij receiving two other signals: an excitation signal Eij and possibly a gating signal Gij. These three signals control the latch so that when both the gating signal and the clock signal are in an "up" state or binary one condition, the latch is set to the value of the excitation signal. When either the clock signal or the gating signal is a binary zero or in a "down" state, the latch cannot change state. It is also to be understood that the clocking may be accomplished by having the clock signal trains act directly on the respective latch sets without utilizing the sets of gating signals G1, G2, G3 and the intermediary AND gates.

Figure 3:
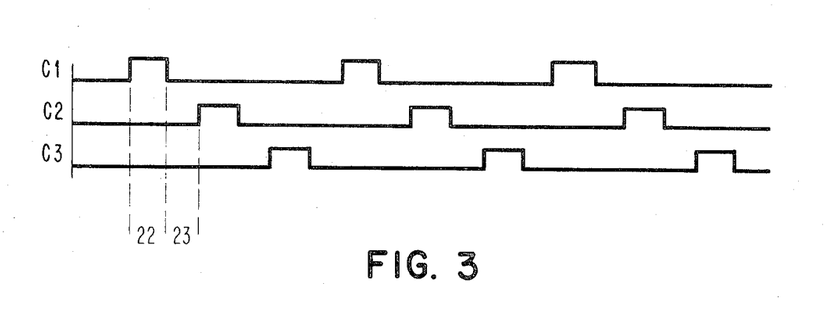
FIG. 3 is a timing diagram of the system clocking employed with the logic system of FIG. 2.

For the normal operation of the logical system, control is exercised by the clock signal trains. With reference to FIG. 3, with the rise of C1 in time frame 22, both C2 and C3 are in a "down" or binary zero state and the inputs and outputs of combinational network 30 are stable. If it is assumed that the external set of inputs S are also not changing, clock signal C1 is then gated through to the latches of set 33 if the corresponding set of gating signals G1 are at an "up" or binary one level. The latches of set 33 are set to the value of their set of excitation signals E1. Thus, some of the latches in latch set 33 may be changed during the time that C1 is in an "up" state. The duration of time frame 22 need only be long enough for the latches to be set. The signal changes in the latches immediately propagate through combinational networks 31, 32 by means of the feedback connections. They also propagate through combination network 36.

Before clock signal C2 can change to an "up" or binary one condition, the output signals from latch set 33 have to complete propagation through combinational networks 31, 32. This duration between clock signals C1 and C2 occurs in time frame 23 which must be at least as long as the propagation time through network 31.

When clock signal C2 is changed from a "down" condition to an "up" condition, the process is continued with the latches in set 34 storing the excitation signals from network 31. In similar manner, clock signal C3 is changed to an "up" condition to latch set 35. Thus, for proper and correct operation of the logic system, it is necessary that the clock signals have a duration long enough to set the latches and a time interval between signals of successive clock trains that is sufficient to allow all latch changes to finish propagating through the combinational networks activated by the feedback connections. Such operation meets the requirement for a level sensitive system and assures a minimum dependency on ac circuit parameters. As will be discussed more fully hereinafter, it is these paths through combinational circuit networks and latch sets that are tested for delay propagation according to the method of the invention.

Information flows into the level sensitive logic system through the set of input signals S. These input signals interact within the logic system by controlling them using the clock signals that are synchronized with the logic system. The particular clock time when the signals change is controlled and then the input signal is restricted to the appropriate combinational networks. For example, with reference to FIG. 2, if the set of signals S always changes at clock time C1, set S may be employed as an input to combinational network 31 or 32 but not as an input to network 30.

If the external input signals are asynchronous in that they change state at any time, then the manner of handling these signals within the logic system is accomplished by synchronizing them using latches. A latch receives as inputs one of the excitation signals as well as the particular clock signal. As the latch cannot change when the clock signal is at a "down" or binary zero condition, the output of the latch only changes during the period when the clock pulse is in an "up" or binary one condition. Even if the set of input signals S changes during the time when the clock signal is in the "up" condition, no operational problem occurs provided the set of input signals S remains at its new value for a full clock cycle. A change of state of the latch occurs on the next clock signal. If the latch almost changes, a spike output might appear from the latch during the time when the clock pulse is in the "up" condition. However, this does not create any problems since the output of this latch is employed only during another clock time.

External output signals, such as the set of responses R, normally do not cause any problem unless there are critical restrictions regarding the timing of the output. For consistency and simplicity, most output signals are probably some function of the latch outputs that are all controlled by the same clock signal. Thus, they remain at a given value for a given number of clock cycles.

A logic system as shown in FIG. 2 has a single-sided delay dependency. It has one of the capabilities required for carrying out the test method of the invention. The other is the scan-in/scan-out capability.

The storage elements of such a generalized system are level sensitive devices that do not have any hazard or race conditions. Circuits that meet this requirement are generally classified as clocked dc latches. One such latch of this type is the polarity hold latch implemented in FIG. 4 in AND Invert gates. The storing portion of the latch is indicated at 24 with AND Invert gates 25, 26 and inverter 27.

Figure 4:
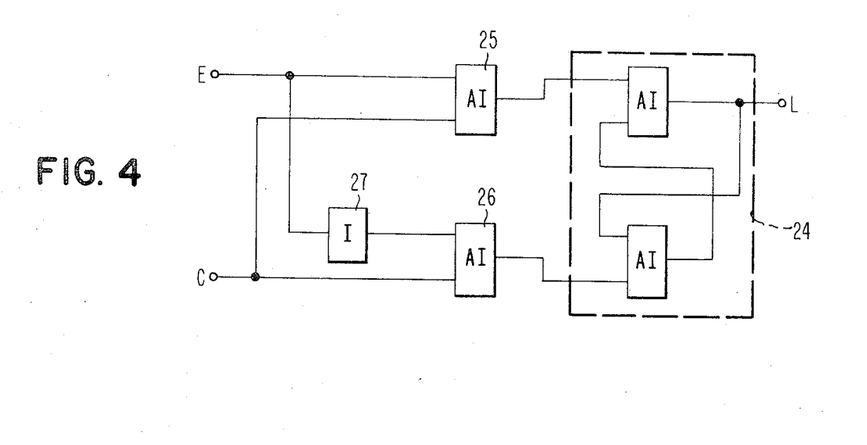
FIG. 4 is a block diagram of one form of a clocked dc latch implemented in AND Invert gates for use in the logic system of FIG. 2.

The polarity hold latch has input signals E and C and a single output indicated as an L. In operation, when clock signal C is at a binary zero level, the latch cannot change state. However, when C is at a binary one level, the internal state of the latch is set to the value of the excitation input E.

To utilize the method of the invention, it is necessary that the generalized logic system have the ability to monitor dynamically the state of all internal storage elements. This ability eliminates the need for special test points, it simplifies all phases of manual debugging, and provides a standard interface for operator and maintenance consoles. To achieve this ability, there is provided with each latch in each latch set of the system, circuitry to allow the latch to operate as one position of a shift register with shift controls independent of the system clocks, and an input/output capability independent of the system input/output. This circuit configuration is referred to as a shift register latch. All of these shift register latches within a given chip, module, etc. are interconnected into one or more shift registers. Each of the shift registers has an input and output and shift controls available at the terminals of the package.

By converting the clocked dc latches into shift register latches, the advantages of shift register latches are present. These include the general capability of stopping the system clock, and shifting out the status of all latches and/or shifting in new or original values into each latch. This capability is referred to as scan-in/scan-out or log-in/log-out.

In the test method of the invention, propagation delay testing is performed on sensitized paths through combinational circuit networks with the sequential circuitry effectively reduced to combinational networks. Scan-in/scan-out provides the necessary capability for accurately diagnosing both design errors and hardware failures for system bring-up, final system tests and field diagnostics. The shift registers are also usable for system functions such as a console interface, system reset, and check pointing.

As is well known in the art, the problem of automatically generating test patterns, as described in connection with FIG. 1, for combinational logic networks is relatively simpler than the generation of test patterns for complicated sequential logic circuits. Accordingly, it is necessary to reduce sequential logic circuits such as the internal storage circuit of the generalized logic system to a combinational form. This is accomplished by including additional circuitry for selectively converting the clocked dc latches into shift register latches and by providing the capability for scan-in/scan-out.

Figure 5:
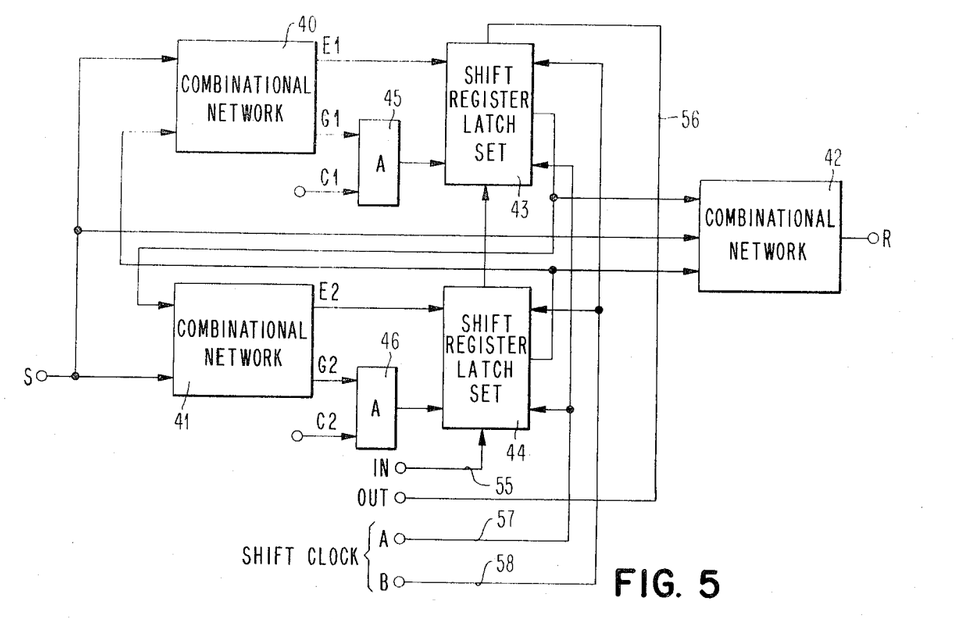
FIG. 5 is a schematic diagram of the organization of a generalized logic system having provision for accomplishing scan-in/scan-out of the system to enable the method of the invention to be performed.

Referring to FIG. 5, there is shown an illustrative logic system having this additional circuitry and clocked by two clock trains. Combinational networks 40, 41, 42 are of the same type and nature as those described in connection with FIG. 2. They respond to sets of input signals S as well as to the latch back signals provided by sets of latches 43, 44. The combinational networks 40, 41 each provides a set of excitation signals E1, E2 and a set of gating signals G1, G2. Through AND gates 45, 46, system clocks C1, C2 are gated to the latch sets 43, 44, respectively.

Figure 6:
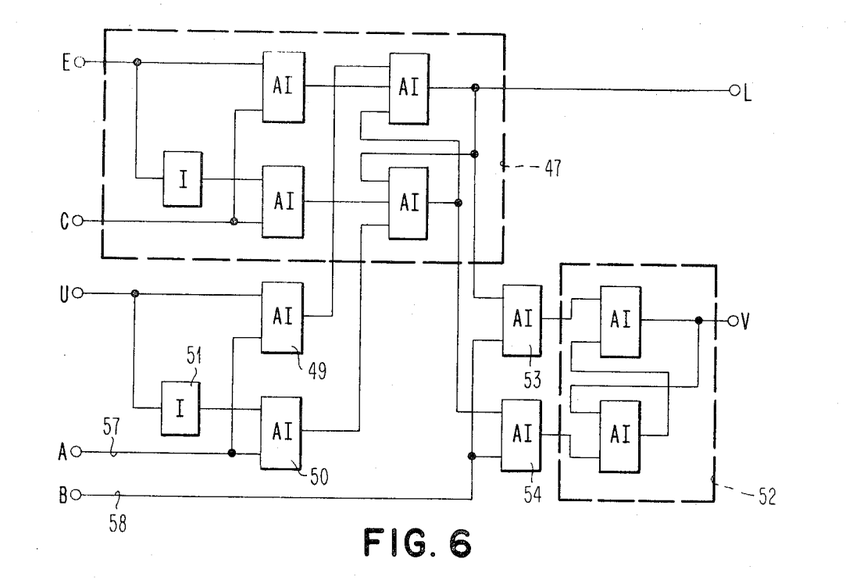
FIG. 6 is a block diagram of a clocked dc latch employed in the structure of FIG. 5 which includes provision for scan-in/scan-out.

Latch sets 43, 44 differ from those of FIG. 2 in that they are connected as shift register latches. Such a shift register latch is shown in FIG. 6 as including two distinct latching or storing circuits 47, 52. Latch 47 is the same as the latch circuits employed in the latch sets of FIG. 2 and as shown in one form in FIG. 4. Each such latch has an excitation input E, a clock signal train input C, and an output indicated as L.

Latch 52 is the additional circuitry so as to render the structure as a shift register latch. It includes a separate input U, a separate output V, and shift controls A and B. The additional input U is provided through AND Invert logic including gates 49, 50 and inverting circuit 51. This circuitry also accepts the first shift control input A on line 57. From these gates 49, 50 coupling is made to the latch circuit 47. From the outputs of latch 47, there is coupled second latching circuit or storing configuration 52 and the AND Invert gates 53, 54 which accept the outputs from the latch configuration of circuit 47 as well as the second shift control input B on line 58.

Circuit 52 acts as a temporary storage circuit during the shifting in and shifting out operation of the arrangement. These shift register latches are employed to shift any desired pattern of ones and zeros into the polarity hold latches 47. These patterns are then employed as inputs to the combinational networks. The outputs from circuit 47 are then clocked into the latch circuit 52 and shifted out under control of shift signal B for inspection and measurement.

Referring again to FIG. 5, each of the latch sets 43, 44 includes a plurality of the circuits shown in FIG. 6. The circuits are sequentially connected together such that the U input of FIG. 6 would be the input line 55 of FIG. 5. The A shift clock is applied to the first circuit (for example, circuit 47) of all of the latches of the sets. Similarly, the B shift clock is applied to the second circuit of each latch of the latch sets. The V output from circuit 52 of FIG. 6 would be coupled as the input to the next succeeding latch of the set until the last such latch of the entire register when this output would be the equivalent of the output line 56 from the arrangement of FIG. 5. The shift register latches are therefore interconnected with an input, an output and two shift clocks into a shift register.

With the requirements of single-sided delay dependency and a scan-in/scan-out capability as described in connection with FIG. 5, test patterns from the test compiler and operation code test generator 17 of FIG. 1 may be provided to unit under test 10 for carrying out the method of the invention. Generally, there are four paths through such a generalized logic system having primary inputs and primary ouputs that must be tested for propagation delays. Two of these paths terminate at the primary outputs and the other two, in a set of latches.

With reference to FIG. 5, one such path is from the set S of system inputs through combinational network 42 to the set R of system responses. A second path is from the system inputs through a combinational network to a set of latches, such as from S through combinational network 40 to latch set 43. A third path is from a latch set, such as 43, through a combinational network, such as 42, to system responses R. The fourth path is from one latch set to a second latch set. Thus, the output of latch set 43 is coupled back through combinational network 41 to the latch set 44.

Figure 7:
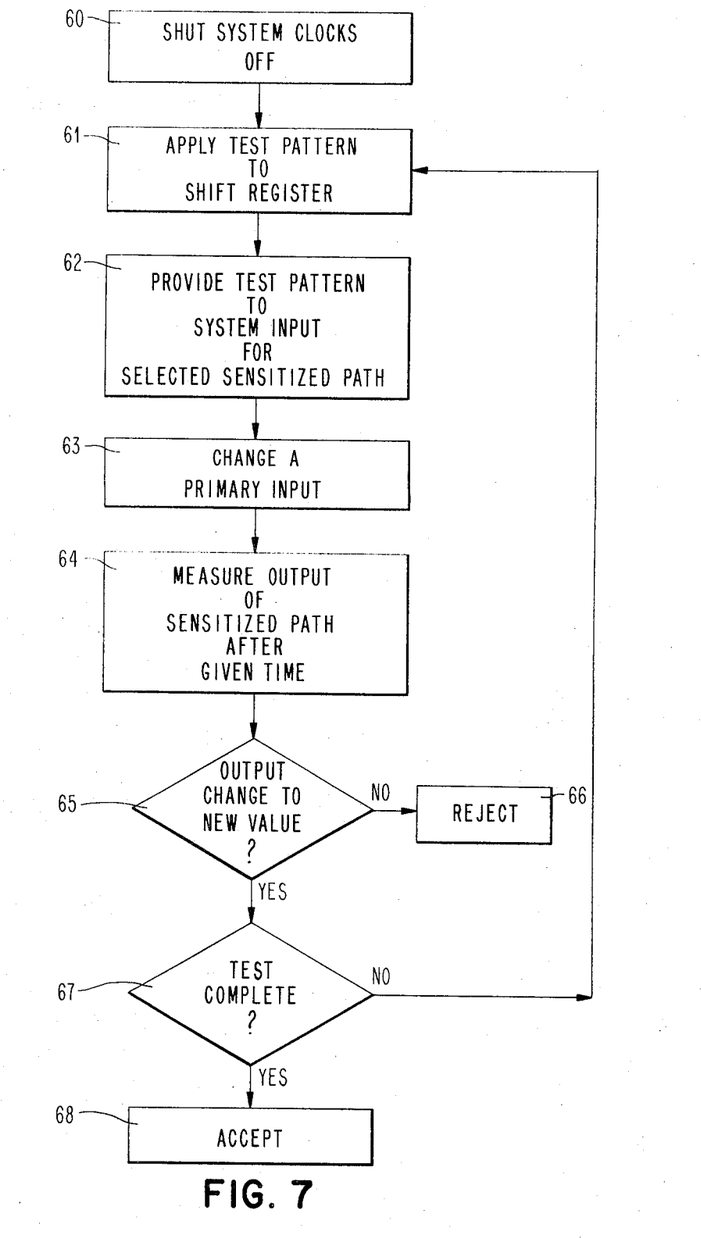
FIG. 7 is a flow diagram of the steps involved in the method of the invention.

To test for propagation delays in any one of these paths or through any circuits serially connected in one of these paths, the method of the invention provides for the system clocks C1, C2 of FIG. 5 to be in an "off" state as indicated at Block 60 of FIG. 7. A particular path as determined by the test generator system of FIG. 1 is selected for sensitization. A test pattern is scanned into the shift register formed of latch sets 43, 44 on input line 55 and under the control of shift clocks A and B, as provided in Block 61. The effect of shifting in the test pattern is to initialize the states of all of the latches in the sets 43, 44. Substantially concurrently with the initialization of the latch states in the shift register, the test pattern is provided at the system inputs S for the particular selected sensitized path of the logic system under test (Block 62).

In its generalized form, the method of the invention provides for a primary input to be changed (Block 63). This input is directly connected to and affects the selected sensitized path. A primary input is understood to be one of the inputs provided as a system input or one of the clock trains dependent on the particular path that is under test. After a given period of time has elapsed that is related to an acceptable propagation delay through the selected sensitized path, the output of this sensitized path is measured as in Block 64. If this measurement indicates that the output did not change to a new value in accordance with interrogation of Block 65, the unit is rejected (Block 66).

Similarly, if a change in the output of the sensitized path was measured during the interrogation of Block 65, interrogation is then made as to whether the testing for the functional logic unit is complete (Block 67). As a practical matter, many hundreds and thousands of such tests are performed to determine the propagation delay characteristics for the unit. If the tests are not completed, the method continues as in Block 61. If the tests are completed, the unit is accepted at Block 68 indicating that the particular propagation delay characteristics set by the automatic test generation system have been met.

Figure 8:
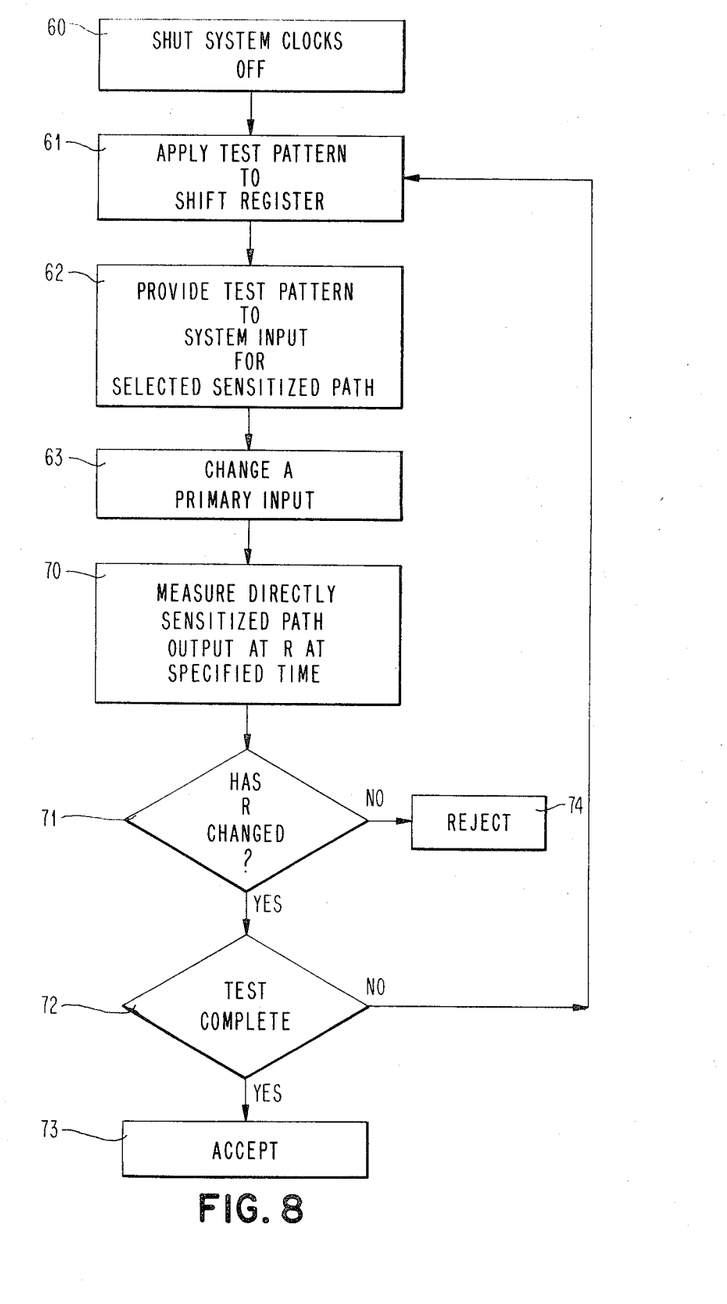
FIG. 8 is a flow diagram in greater detail of the steps in carrying out a portion of the invention when the measurement is made directly.

As previously noted, there are four general types of paths that must be sensitized in carrying out the method of the invention in determining propagation delays. One such path is from a primary input to a primary output. With reference to FIG. 5, this path runs from set S of system input signals through combinational network 42 to set R of system responses. To effect the change in a primary input, one of the system inputs is altered and the measurement of a change is performed according to a more detailed implementation of the measuring portion of the method of the invention, as shown in FIG. 8. After a predetermined period of time has elapsed, which is related to an acceptable propagation delay, the measurement is made directly at the output of the sensitized path, as in Block 70. Interrogation is made at 71 to determine if at least one of the set R of system responses has changed. If it has not changed, the unit is rejected at 74. On the other hand, the interrogation continues to determine if the testing is complete as in Block 72. If it is not, additional test patterns are sequentially supplied according to the method of the invention. When the testing is complete and all of the measurements for all of the test patterns have indicated a change, then the unit under test is accepted at 73.

The measuring steps involved where the sensitized path is from a set of latches to a primary output is performed in the same manner. Such a path would begin in one of the circuits in latch set 43, pass through combinational network 42 to the set R of system responses. In carrying out the propagation delay test on this type of sensitized path, the required test pattern is used to initialize the states of the latch circuits in latch sets 43, 44, and the required pattern is provided to set S of primary inputs. In addition, inputs are applied to combinational network 40 from set S and the output of latch set 44 to assure that the desired changes occur in latch set 43. Testing then occurs by raising and lowering the C1 clock train. This causes one of the latch circuits in latch set 43 to change state. The change is propagated through combinational network 42 to system responses R. Measurement is made according to the method of FIG. 8 directly at the output of the sensitized path.

The measurement occurs after a period of time has elapsed between raising the C1 clock train line to determine, as required in Block 70, if a change in R has occurred. The particular elapsed time is the specified acceptable delay for such a path. Dependent upon the outcome of the interrogation as to a change in Block 71, the method of the invention continues in the same manner as described when the sensitized path is from a primary input to a primary output. Similar steps are employed for sensitized paths from the latch circuits of latch set 44 to the system responses.

Figure 9:
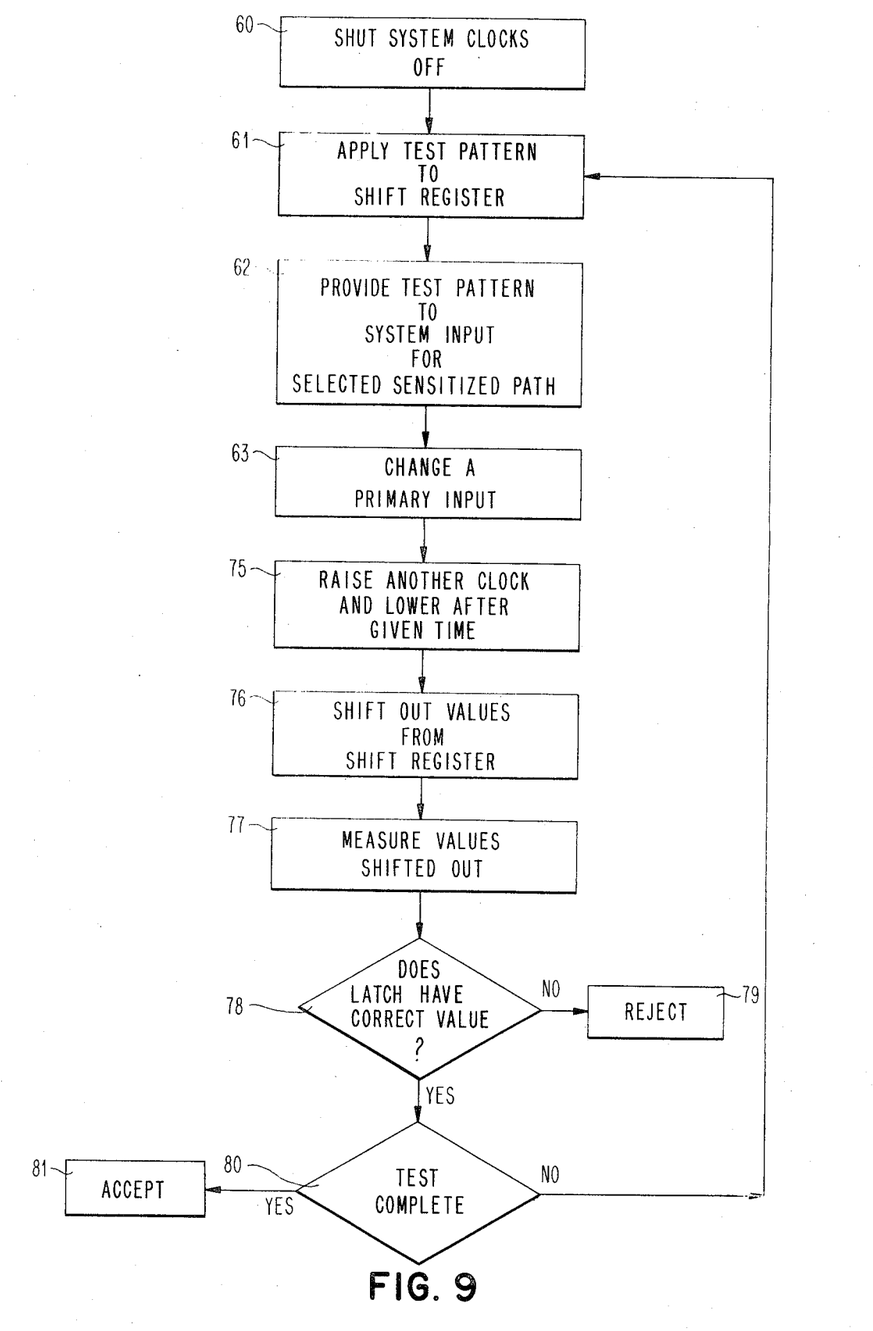
FIG. 9 is a flow diagram in greater detail of the steps in carrying out the method of the invention when the measurement is made after scanning out.

The other two general types of sensitized paths through a functional logic unit terminate in a set of latches. The measuring is performed by gating in the signals provided by a combinational network into a set of latches and then employing the independent scan access and controls of the system of FIG. 5 for scanning out the state of the latch sets. In this manner, it is determined if the inputs to the latch set had changed to their new values prior to the turning off of the system clock. The steps of the method for this type of sensitized path are shown in FIG. 9.

One such general path is from a primary input to a latch set, such as from set S through combinational network 40 to latch set 43. The test for propagation delay through such a path is made by altering one of the primary inputs of set S (Block 63). Thereafter, clock train C1 is exercised by raising and lowering it, as indicated in Block 75 of FIG. 9. This gates any change in the output of network 40 into latch set 43.

To perform the measurement for a possible change, the state of the latch circuits in set 43 is shifted out using the shift controls, that is the clocks A and B. The state of these circuits appears on line 56 (Block 76). The values appearing on line 56 are measured as in Block 77 and interrogation is made at 78 to determine if a change occurred in a latch circuit in a particular position to denote whether the propagation delay was less than the time between the change in the primary input and the fall of the clock train C1.

The interrogation made in Block 78 provides an indication of a change. If no change occurred, the unit under test is rejected at 79. If a change did occur, interrogation is made at 80 to determine if the tests on the unit have been completed. If not, the testing continues as provided in Block 61. Otherwise, the unit is accepted (Block 81).

The fourth general type of sensitized path runs from a latch set through a combinational network to a second latch set, such as from latch set 44 through combinational network 40 to latch set 43. The appropriate inputs are applied to combinational network 40 from the set S of primary inputs and also from the inputs derived from latch set 44, after latch sets 43 and 44 have been initialized using the independent scan access and controls. In addition, appropriate test pattern inputs are applied to combinational network 41 from set S of primary inputs and from the latch set 43 to assure the desired change in latch set 44.

Testing for the propagation delay through this sensitized path is then performed by raising and lowering the C2 clock train line. After a predetermined elapsed time, the C1 clock train line is raised and thereafter lowered. If the change that occurred in one of the latch circuits of latch set 44 has reached a circuit in latch set 43 by the time clock train C2 is lowered, a new state will exist for this circuit in latch set 43. This state can then be shifted out as provided in Block 76 of FIG. 9 for measurement at 77 when it appears on line 56. A determination can then be made whether the delay through the sensitized path is acceptable.

The method described above is employed for testing propagation delays through sensitized paths involving combinational logic networks. The delays of the latches are tested by applying minimum duration clock pulses at the train C1 and C2. In this manner, any path that can be exercised during normal operation of such a generalized logic system can be sensitized and tested according to this method. The method involves the setting up of the latch sets with predetermined patterns in the circuits of the sets. Thereafter, a primary input is altered. Dependent on the particular path, this alteration involves the changing of one of the set S of primary inputs or one of the clock train inputs. Thereafter, following a predetermined period of elapsed time, measurement is made for a change at the output of the sensitized path, either directly or by clocking and gating the signals into a latch set and thereafter scanning out from this latch set for observation. The method of the invention, therefore, provides a substantial indication as to the dynamic performance of a functional logic unit.

While the invention has been particularly shown and described with reference to the preferred embodiments thereof, it will be understood by those skilled in the art that the foregoing and other changes in form and detail may be made therein without departing from the spirit and scope of the invention.

What is claimed is:

1. A method of propagation delay testing a single-sided delay dependent functional logic unit having primary inputs and primary outputs and formed of combinational networks and sets of associated sequential circuits having access for scanning independent of said primary inputs and outputs, comprising the steps of
   selecting a predetermined path through at least a portion of said unit for test sensitization,
   initializing the states of said sets of circuits,
   applying a test pattern to at least some of said primary inputs for said selected path,
   altering one of said primary inputs to the selected path, and
   measuring the output of said selected path for a change of state after a given period of time has elapsed from the altering of the primary input, whereby an indication of the propagation delay through the selected path is obtained.

2. The method of claim 1, wherein initialization of the states of said set is accomplished by scanning a predetermined signal pattern into said sets through said scanning access.

3. The method of claim 2, wherein the method is repeated a plurality of times by selecting a plurality of paths and applying a plurality of test patterns in sequence.

4. The method of claim 2, wherein the output of the sensitized path is a primary output of the unit and the measuring is performed directly by observing any change in a primary output.

5. The method of claim 4, wherein the sensitized path commences at the primary inputs and passes through a combinational network and the direct measurement is made a given time after effecting an alteration in one of the primary inputs.

6. The method of claim 4, wherein some of said primary inputs are clock trains coupled respectively to the sets of sequential circuits and the sensitized path commences in a set of said sequential circuits and passes through a combinational network and the direct measurement is made a given time after effecting a change in the clock train for the set where the path commences.

7. The method of claim 3, wherein some of said primary inputs are clock trains coupled respectively to the sets of sequential circuits and the output of the sensitized path is in one of the sets of said sequential circuits and the measuring is performed by effecting a change in the clock train for the set having the output of said path and there-after scanning out the contents of said set for obtaining an indication of a change in said set.

8. The method of claim 7, wherein the sensitized path commences at the primary inputs and passes through a combinational network to said set of sequential circuits and the altering of the primary input occurs a predetermined period of time before a change is effected in the clock train.

9. The method of claim 7, wherein the sensitized path commences at one set of sequential circuits and passes through a combinational network to the output of said path in another set of said circuits and the altering of the primary input is accomplished by changing the clock train for the one set of circuits a predetermined period of time prior to the measuring.

* * * * *